United States Patent
McKechnie et al.

(10) Patent No.: US 11,285,421 B2
(45) Date of Patent: Mar. 29, 2022

(54) FILTER MEDIA FOR FILTRATION OF COOKING FUMES

(71) Applicant: Electrolux Home Products, Inc., Charlotte, NC (US)

(72) Inventors: Robert McKechnie, Charlotte, NC (US); William D. Hanrahan, Charlotte, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 312 days.

(21) Appl. No.: 16/380,213

(22) Filed: Apr. 10, 2019

(65) Prior Publication Data
US 2019/0314750 A1 Oct. 17, 2019

Related U.S. Application Data

(60) Provisional application No. 62/656,595, filed on Apr. 12, 2018.

(51) Int. Cl.
*B01D 46/00* (2006.01)
*F24C 15/20* (2006.01)
*B01D 39/16* (2006.01)

(52) U.S. Cl.
CPC ....... *B01D 46/0036* (2013.01); *B01D 39/163* (2013.01); *B01D 39/1676* (2013.01);
(Continued)

(58) Field of Classification Search
CPC ............. B01D 46/0036; B01D 39/163; B01D 39/1676; B01D 2239/1225;
(Continued)

(56) References Cited

U.S. PATENT DOCUMENTS

| 346,694 A | 8/1886 | Wallace |
| 1,544,690 A | 7/1925 | Shurtleff |

(Continued)

FOREIGN PATENT DOCUMENTS

| DE | 1536756 | 1/1970 |
| DE | 102005008373 | 8/2006 |

(Continued)

OTHER PUBLICATIONS del Piero et al. (On the visco-elastic properties of open-cell polyurethane foams. 6th International Congress of the Croatian Society of Mechanics, Oct. 2009, Dubrovnik, Croatia, cd-rom) (Year: 2009).*

(Continued)

*Primary Examiner* — Jonathan Miller
*Assistant Examiner* — Gabriel E Gitman
(74) *Attorney, Agent, or Firm* — Pearne & Gordon LLP (57) ABSTRACT

A kitchen appliance has a compressible filter media block for removing odor-causing contaminants from cooking fumes. The sintered-fiber media exhibits low pressure drop and high flow rate. Embedded sorbent particles are adhered to the media block, preferably via sintering, thus leaving a substantial proportion of adsorbent surface area exposed for filtration purposes. The media block can be elastic or viscoelastic making it useful in retrofit applications for use in filtration circuits not originally designed to accommodate a filter. In preferred embodiments, the media block is composed of sintered plastic fibers wherein the sorbent particles are adhered thereto via sintering.

14 Claims, 4 Drawing Sheets

(52) U.S. Cl.
CPC ...... *F24C 15/2021* (2013.01); *F24C 15/2035* (2013.01); *F24C 15/2042* (2013.01); *B01D 2239/045* (2013.01); *B01D 2239/0407* (2013.01); *B01D 2239/0618* (2013.01); *B01D 2239/1225* (2013.01); *B01D 2239/1233* (2013.01); *B01D 2275/40* (2013.01); *B01D 2279/35* (2013.01)

(58) Field of Classification Search
CPC ...... B01D 2239/0407; B01D 2239/045; B01D 2239/0618; B01D 2239/1233; B01D 2279/35; B01D 2275/40; F24C 15/2021; F24C 15/2035; F24C 15/2042; H05B 6/6402
See application file for complete search history.

(56) References Cited

U.S. PATENT DOCUMENTS

| | | | |
|---|---|---|---|
| 2,408,158 A | 9/1946 | Belsher | |
| 2,505,175 A | 4/1950 | Davis | |
| 2,608,396 A | 8/1952 | Shapiro | |
| 2,637,540 A | 5/1953 | Rowe | |
| 2,978,064 A | 4/1961 | Deaver | |
| 3,002,584 A | 10/1961 | Jerabek | |
| 3,019,854 A | 2/1962 | O'Bryant | |
| RE27,225 E | 11/1971 | Stalker | |
| 3,853,519 A | 12/1974 | York | |
| 4,460,394 A | 7/1984 | Wrightson | |
| 4,610,705 A | 9/1986 | Sarnosky | |
| 4,689,058 A | 8/1987 | Vogt | |
| 4,690,701 A | 9/1987 | Hendrick | |
| 4,701,196 A | 10/1987 | Delany | |
| 5,016,612 A | 5/1991 | Berardi | |
| 5,075,000 A | 12/1991 | Bernard | |
| 5,114,448 A | 5/1992 | Bartilson | |
| 5,399,180 A | 3/1995 | Kopp | |
| 5,458,772 A | 10/1995 | Eskes | |
| 5,616,169 A * | 4/1997 | de Ruiter | B01D 39/1676 55/DIG. 42 |
| 5,665,235 A * | 9/1997 | Gildersleeve | B01D 39/083 210/503 |
| 5,762,797 A | 6/1998 | Patrick et al. | |
| 5,807,424 A * | 9/1998 | de Ruiter | B01D 39/1676 55/486 |
| 5,868,933 A | 2/1999 | Patrick et al. | |
| 5,886,330 A | 3/1999 | Kang et al. | |
| 6,033,453 A | 3/2000 | Weddell | |
| 6,171,496 B1 | 1/2001 | Patil | |
| 6,264,713 B1 | 7/2001 | Lewis | |
| 6,267,252 B1 * | 7/2001 | Amsler | B01D 39/163 210/483 |
| 6,283,308 B1 | 9/2001 | Patill et al. | |
| 6,293,983 B1 | 9/2001 | More | |
| 6,656,244 B1 | 12/2003 | Galassi | |
| 6,670,594 B1 | 12/2003 | Jeong et al. | |
| 6,717,123 B1 | 4/2004 | Kim | |
| 6,849,214 B2 | 2/2005 | Patil | |
| 6,854,601 B2 | 2/2005 | Patil | |
| 6,860,916 B2 | 3/2005 | Kubokawa | |
| 6,897,420 B2 | 5/2005 | Hoh | |
| 6,949,214 B2 | 9/2005 | Frey | |
| 6,955,702 B2 | 10/2005 | Kubokawa | |
| 7,019,272 B2 | 3/2006 | Braunisch et al. | |
| 7,147,685 B2 | 12/2006 | Lee | |
| 7,180,041 B2 | 2/2007 | Song et al. | |
| 7,465,332 B2 | 12/2008 | Randinelli | |
| 7,588,617 B2 | 9/2009 | Kyllönen | |
| 7,629,561 B2 | 12/2009 | Sohn et al. | |
| 7,993,423 B2 | 8/2011 | Kyllönen | |
| 8,197,568 B2 | 6/2012 | Reiff | |
| 8,277,530 B2 | 10/2012 | Alexander | |
| 8,389,917 B2 | 3/2013 | Jeong | |
| 8,410,411 B2 | 4/2013 | Song | |
| 8,652,241 B2 | 2/2014 | Alexander | |
| 8,658,954 B2 | 2/2014 | Song | |
| 9,079,130 B2 | 7/2015 | Kim | |
| 9,242,200 B2 | 1/2016 | Alexander | |
| 2003/0207635 A1 * | 11/2003 | Minemura | B01J 20/28069 442/327 |
| 2004/0016345 A1 * | 1/2004 | Springett | A41D 13/1146 96/66 |
| 2006/0032807 A1 * | 2/2006 | Sansalone | B01J 20/28057 210/263 |
| 2007/0293133 A1 | 12/2007 | Marcotte | |
| 2008/0072753 A1 | 3/2008 | Lukens | |
| 2008/0202491 A1 * | 8/2008 | Eberhard | B01D 46/0002 126/299 D |
| 2011/0034579 A1 * | 2/2011 | Pinto | B01J 20/28045 521/172 |
| 2012/0111197 A1 | 5/2012 | Weisman | |
| 2012/0152227 A1 | 6/2012 | Oagley | |
| 2012/0204855 A1 | 8/2012 | Huber | |
| 2013/0036907 A1 * | 2/2013 | Yamashita | B01D 39/1615 95/90 |
| 2013/0087134 A1 | 4/2013 | Mikulec | |
| 2013/0101805 A1 * | 4/2013 | Altshuler | D04H 1/5418 428/172 |
| 2013/0160410 A1 | 6/2013 | Kim et al. | |
| 2013/0240509 A1 | 9/2013 | Kim | |
| 2014/0042156 A1 | 2/2014 | Kim | |
| 2014/0138305 A1 * | 5/2014 | Crandall | B24B 37/245 210/502.1 |
| 2014/0201919 A1 * | 7/2014 | Albero | A61G 7/057 5/644 |
| 2014/0265009 A1 * | 9/2014 | Schaffitzel | B29C 43/226 264/171.13 |
| 2015/0101588 A1 | 4/2015 | Yoon | |
| 2015/0107202 A1 | 4/2015 | Wallner | |
| 2015/0128804 A1 | 5/2015 | Salpietra | |
| 2015/0192306 A1 | 7/2015 | Armstrong | |
| 2015/0283489 A1 | 10/2015 | Kim | |
| 2016/0296870 A1 * | 10/2016 | Mckechnie, IV | B01D 46/009 |

FOREIGN PATENT DOCUMENTS

| | | |
|---|---|---|
| EP | 0603537 | 6/1994 |
| EP | 2610555 | 7/2013 |

OTHER PUBLICATIONS

EMW Filtertechnik (Poret Carbon Material Safety Data Sheet, 2010) (Year: 2010).*

Polysorb (Polysorb activated carbon filters, 2016, Columbus Industries, Inc., https://www.filtersales.com/pdf/polysorb_carbon_media.pdf) (Year: 2016).*

UFP (Reticulated Polyurethane Foam, 2013, UFP Technologies, https://www.ufpt.com/materials/foam/reticulated-polyurethane-foam.html) (Year: 2013).*

* cited by examiner

| | Dimensions | | | | Pressure Drop at 164 cfm (in. H₂O) | Initial Efficiency (60 mins) | | | | Capacity Test | |
|---|---|---|---|---|---|---|---|---|---|---|---|
| | L | W | H | Vol. (in³) | | Avg. upstream [toluene] (ppb) | Average efficiency (%) | Avg. Penetration (%) | Avg. upstream [toluene] (ppm) | Time to 95 % breakthrough | |
| Example 1 (50 g C / sq.ft.)[1] | 10.5 | 2.25 | 2.5 | 59.063 | 3.32 | 426 | 32 % | 68 % | 58.5 | ~ 15 mins | |
| Example 2 (100 g C / sq.ft.) | 10.25 | 2 | 1.375 | 28.188 | 2.25 | 378 | 21 % | 79 % | 52 | ~ 12 mins | |
| Comparative Example A.1 | 10 | 3 | negl. | -- | 1.97 | 399 | -2 % | 102 % | 49.6 | < 2 mins | |
| Comparative Example A.2 | 10.25 | 2.375 | 0.312 | 7.595 | 2.83 | 403 | 2% | 98 % | 52.9 | < 3 mins | |
| Comparative Example A.3 | 10.25 | 2.375 | 0.312 | 7.595 | 2.81 | 417 | 1% | 99 % | 49.1 | < 3 mins | |
| Comparative Example A.4 | 10.25 | 2.375 | 0.312 | 7.595 | 3.18 | 424 | -1 % | 101% | 53.2 | < 2 mins | |
| AVERAGES: | | | | | 2.6975 | | 0 | 1 | | < 2.5 mins | |
| Comparative Example B.1 | 8.75 | 3.875 | 0.312 | 10.579 | 2.12 | 415 | -4 % | 104 % | 48.8 | < 2 mins | |
| Comparative Example B.2 | 8.75 | 3.875 | 0.312 | 10.579 | 0.51 | 432 | 3% | 97 % | 51.8 | < 7 mins | |
| Comparative Example B.3 | 8.75 | 3.875 | 0.312 | 10.579 | 0.5 | 445 | 0% | 100 % | 42.6 | < 2 mins | |
| Comparative Example B.4 | 8.75 | 3.875 | 0.312 | 10.579 | 0.48 | 459 | 2% | 98 % | 49.5 | < 7 mins | |
| AVERAGES: | | | | | 0.9025 | | 0.0025 | 100 % | | < 4.5 mins | |
| Comparative Example C.1 | 6.25 | 3.875 | 0.312 | 7.556 | 0.61 | 400 | -6 % | 106 % | 49.7 | < 2 mins | |
| Comparative Example C.2 | 6.25 | 3.875 | 0.312 | 7.556 | 2.31 | 406 | 0% | 100 % | 50.5 | < 7 mins | |
| Comparative Example C.3 | 6.25 | 3.875 | 0.312 | 7.556 | 2 | 448 | 5% | 95 % | 53.7 | < 5 mins | |
| Comparative Example C.4 | 6.25 | 3.875 | 0.312 | 7.556 | 2.13 | 429 | -2 % | 102 % | 50.7 | < 5 mins | |
| AVERAGES: | | | | | 1.7625 | | -0.0075 | 101% | | < 4.75 mins | |
| Comparative Example D.1 | 5.125 | 5.375 | 0.312 | 8.595 | 1.52 | 399 | -4 % | 104 % | 48 | < 3 mins | |
| Comparative Example D.2 | 5.125 | 5.375 | 0.312 | 8.595 | 1.28 | 416 | 0% | 100 % | 50.8 | < 3 mins | |
| Comparative Example D.3 | 5.125 | 5.375 | 0.312 | 8.595 | 2.28 | 424 | 0% | 100 % | 52.1 | < 5 mins | |
| Comparative Example D.4 | 5.125 | 5.375 | 0.312 | 8.595 | 3.28 | 408 | -3 % | 103 % | 48.4 | < 5 mins | |
| AVERAGES: | | | | | 2.09 | | -0.0175 | 102 % | | < 4 mins | |
| Comparative Example E.1[2] | 9.125 | 2.75 | 0.75 | 18.820 | 0.95 | 412 | -2 % | 102 % | 47.4 | < 3 mins | |
| Comparative Example E.2 | 9.125 | 2.75 | 0.75 | 18.820 | 0.58 | 441 | -1 % | 101 % | 51.2 | < 2 mins | |
| Comparative Example E.3 | 9.125 | 2.75 | 0.75 | 18.820 | 0.6 | 399 | 3 % | 97 % | 52.7 | > 7 mins[3] < 15 mins | |
| Comparative Example E.4 | 9.125 | 2.75 | 0.75 | 18.820 | 0.69 | 402 | -5 % | 105 % | 52.7 | < 3 mins | |
| AVERAGES: | | | | | 0.705 | | -0.0125 | 101% | | < 3.75 - 5.75 mins | |

[1]. Example 1 test conditions were 34 % R.H.; filter as tested comprised two panels stacked in series to arrive at final height of 2.5 inches.
[2]. Comparative Examples E.1-E.4 were a pleated panel having 30 pleats. Overall height reported in table was pleat height.
[3]. Downstream concentration data collection was off between 7 and 15 minutes; breakthrough occurred sometime during this interval.

FILTER MEDIA FOR FILTRATION OF COOKING FUMES

CROSS-REFERENCE TO RELATED APPLICATIONS

This application claims the benefit of U.S. Provisional Patent Application No. 62/656,595 filed on Apr. 12, 2018. The entire disclosure of which is hereby incorporated herein by reference.

BACKGROUND

Field

The present disclosure relates to filter media for filtering cooking fumes. More particularly, it relates to such filter media effective to remove odor-causing contaminants from such fumes prior to being recirculated into the kitchen environment in an over-the-range application.

Description of Related Art

Over-the-range ("OTR") appliances are well known. They include, for example, microwaves and vent hoods. A vent hood is a dedicated appliance for drawing cooking fumes and either exhausting them to the outside or filtering them before recirculating them back into the kitchen. An OTR microwave often will have built in a ventilation system for doing the same thing. Other OTR appliances can have similar ventilation systems built in to exhaust or filter cooking fumes generated in the kitchen; e.g. from a cooking range located below the OTR appliance.

Over 80 percent of OTR ventilation systems, regardless of the specific appliance (hood, microwave, etc.), are configured to recirculate filtered air back into the kitchen environment, not to exhaust it to the outside. Such systems can be equipped with a filtration medium (e.g. a substrate impregnated with sorbent, such as activated carbon) to remove odor-causing contaminants from cooking fumes prior to recirculating back to the kitchen environment. However, current filtration media are unsatisfactory for this purpose. They have fairly low capacity and quickly become saturated, and hence no longer effective. Often such media also are not straightforward to replace and are thus left in place for a significant time beyond their useful life; oftentimes for the full operational life of the appliance.

A filter medium for OTR applications having the ability to hold higher sorbent loads, therefore having greater capacity for odor-causing contaminants, is desirable. Also desirable is such a medium that is straightforward to install and replace, and preferably which can be used in a wide range of OTR filtration systems.

SUMMARY OF THE INVENTION

A kitchen appliance includes an air-venting circuit configured to draw cooking fumes, and a filter disposed in the air-venting circuit to remove odor-causing contaminants from the cooking fumes prior to discharge thereof. The filter has a conformable media block that can include sintered plastic fibers and sorbent particles adhered to the plastic fibers via sintering. In preferred embodiments the plastic fibers are non-woven fibers. Such a media block alternatively can comprise conformable polymeric foams which have been impregnated with sorbent particles, or other non-woven fabric composites that have been impregnated with sorbent particles and formed into a conformable block.

BRIEF DESCRIPTION OF THE DRAWINGS

FIG. 6 tabulates test results demonstrating filter performance under a variety of conditions as set forth in the specification.

DETAILED DESCRIPTION

Figure 1:
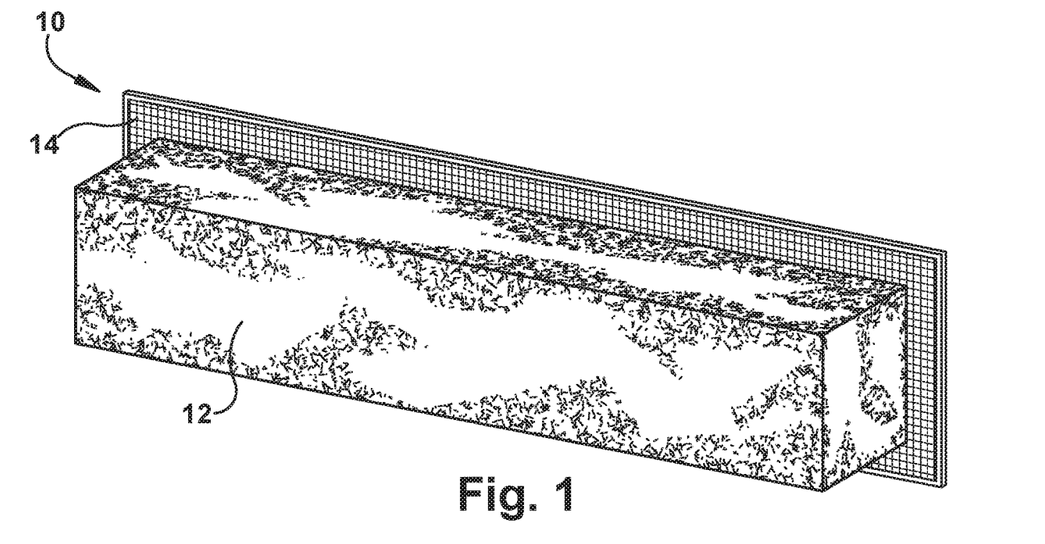
FIG. 1 is a rear perspective view of an example filter as herein disclosed.

FIG. 1 shows an example filter 10 for use in a kitchen appliance, such as an OTR appliance, for example a microwave oven or vent hood. The filter is designed to be disposed or placed within the air-venting circuit in a kitchen appliance (which can be configured as an OTR appliance) where it can filter odors generated adjacent (e.g. beneath) the appliance. In the case of an OTR appliance such odors typically would be generated from an underlying cooktop or range. Particularly when the fumes will be recirculated back into the kitchen environment, it is desirable for the air-venting circuit to filter odor-causing contaminants prior to the air from those fumes being discharged. For ease of explanation, the filter 10 will be discussed in the case of its installation in an OTR microwave oven. But other implementations are contemplated, such as a vent hood and others as noted above.

Figure 2:
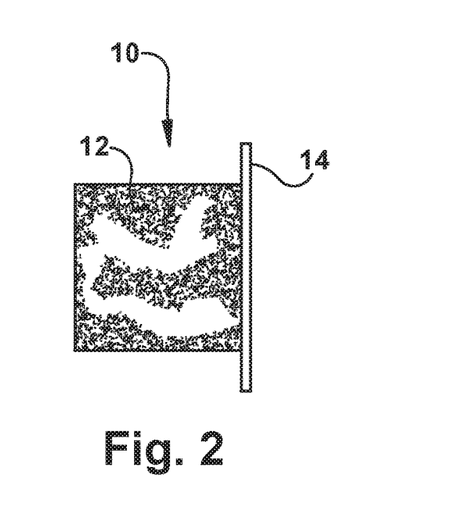
FIG. 2 is a side view of the filter in FIG. 1.

In certain embodiments, the filter 10 is designed to be placed into an air duct or plenum within the OTR microwave oven, to filter an airflow within the duct before it is discharged. The airflow can be a recirculating air flow drawn from the kitchen (e.g., above a cooktop), or it can be a discharge airflow from the cooking cavity of the microwave oven; or it can receive and filter air from both locations. In FIGS. 1 and 2, the filter 10 has a media block 12 and a face sheet 14. The face sheet 14 can be larger than the media block 12, allowing the face sheet to act as a flange for mounting the media block within an air duct. Alternatively, the media block 12 can be provided as a stand-alone element, without any face sheet 14. The face sheet 14 may be desirable when the media block 12 is to be inserted into a vent duct in a retrofit application, so the face sheet 14 fixes the insertion depth of the media block 12 into the duct. But the face sheet 14 is not required, even in this application. When present the face sheet 14 is made so that it does not substantially impede air flow. For example, it can be a high-porosity fabric or screen material to which the media block 12 is adhered.

Figure 3:
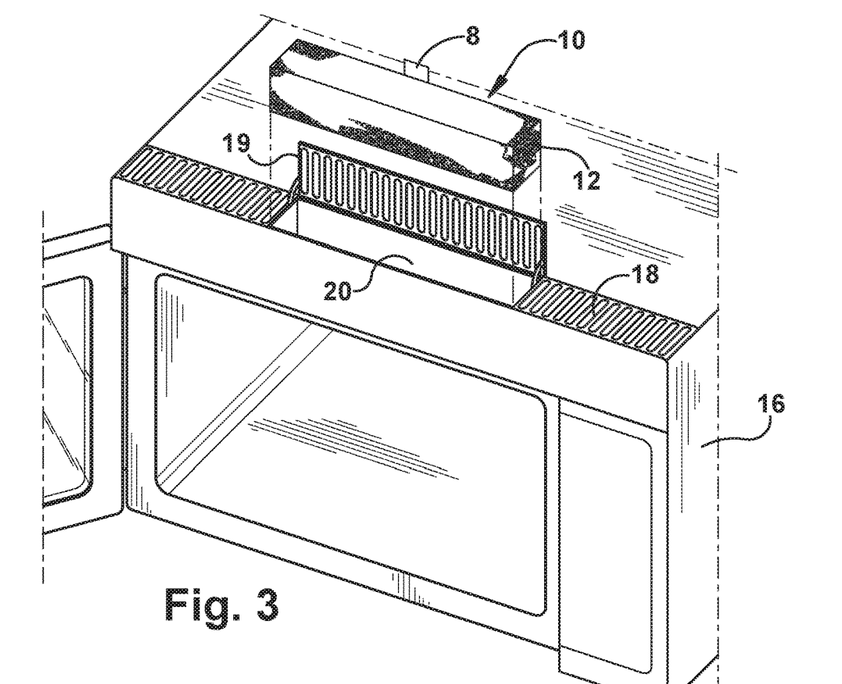
FIG. 3 shows a further embodiment, wherein an appliance includes a door for accessing a filter receptacle for installation of a filter.
Figure 4:
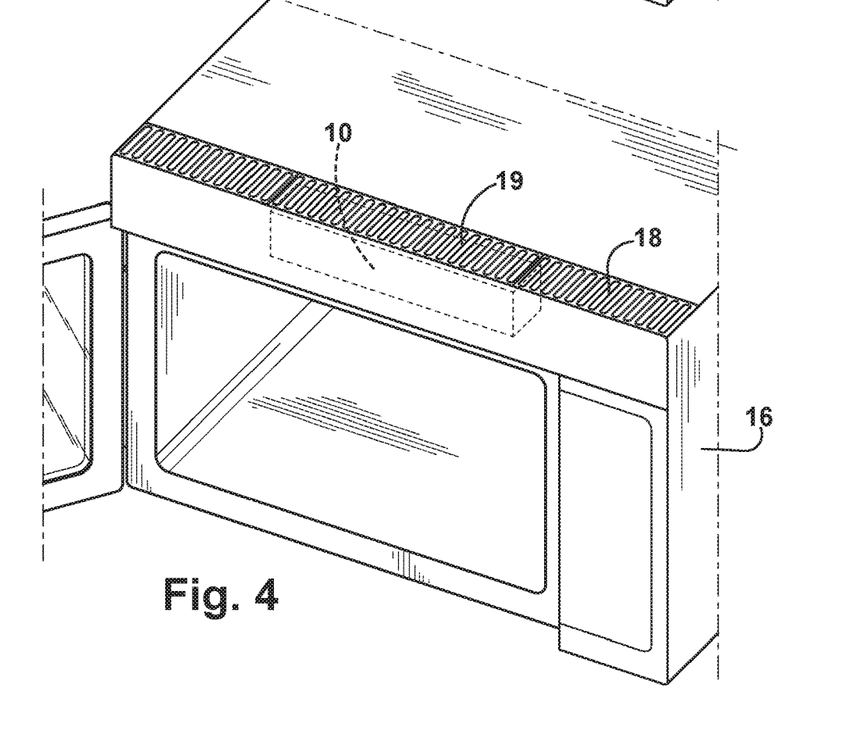
FIG. 4 shows the embodiment of FIG. 3, but with the door closed.

FIGS. 3 and 4 illustrate a further embodiment wherein a filter 10 (in this embodiment having no face sheet 14) is inserted into an OTR microwave 16. In the illustrated embodiment the microwave is configured to receive the filter 10. Namely, a door 19 is fitted onto the louver 18 or other external surface of the appliance, over a filter receptacle 20 that is configured to receive and accommodate the filter 10. The door 19 can be hinged to the appliance, e.g. as shown in FIGS. 3 and 4. Alternatively, the door 19 can be configured to be snapped into place via resilient tabs fixed to the door 19 and cooperating with associated receptacles or detents within the appliance, or vice versa (not shown). Other suitable or conventional structure for reversibly opening (e.g. removing) and closing the door 19 could be readily selected and implemented by the person of skill in the art.

The door 19 closes an opening in the cabinet of the microwave 16 through which the filter 10 is inserted into the underlying receptacle 20. The receptacle 20 preferably comprises a portion of the exhaust duct for the appliance, through which air such as cooking fumes drawn via a fan (not shown) of the appliance are discharged. In preferred embodiments, the receptacle 20 constitutes (or is part of a) terminal portion of) the exhaust duct so that air flowing through the duct must pass through an installed filter 10 to remove undesired contaminants prior to being discharged. The door 19 can be formed in, e.g. as part of, the exhaust louver 19 through which discharged air must pass on exiting the appliance as shown in FIGS. 3 and 4. In this configuration, preferably the door 19 is formed having geometric structure rendering it substantially continuous in both function and form with the remainder of the louver 18 about the opening that is sealed via the door 19 when closed, as best seen in FIG. 4. Alternatively, the door 19 can be disposed in another portion of the appliance cabinet; e.g. adjacent the exit louver 18 or even at an entrance of the air-venting circuit in the appliance. In such a case, the door 19 preferably again is configured so that it follows the form and geometry of the surrounding cabinet structure so as to be substantially continuous therewith in order to provide a substantially seamless, aesthetic appearance from the outside.

In embodiments as above where the microwave is configured to receive the filter 10 via a door 19, to install a filter 10 first the door is opened to provide access to the underlying receptacle 20 as seen in FIG. 3. If there is already a filter present in the receptacle 20, then it is removed, e.g. by grasping and pulling an attached tab 8. The used filter can be discarded. The new filter 10 is inserted into the empty receptacle 20 via the exposed opening that is normally closed by the door 19, until it is seated therein. The filter 10 may be seated fully against a floor of the receptacle 20, e.g. in case the exhaust duct meets the receptacle 20 from a lateral direction. Alternatively, if the duct approaching the receptacle 20 is coaxial with the receptacle opening, e.g. if the louver in FIGS. 3 and 4 faced forward rather than upward and the door therefore were in the front face of the appliance, then a ledge or flange may be provided within the duct at the depth corresponding to the insertion depth of the filter 10, thereby partially defining the receptacle 20 in order to seat the filter 10 therein. Once the filter 10 is fully inserted within the receptacle 20, the door 19 is closed as seen in FIG. 4 and the appliance is ready to be operated to filter air via the newly installed filter 10. Once that filter 10 becomes saturated or otherwise spent, it can be replaced in a similar manner as above.

In an alternative embodiment the microwave 16 is not configured to receive the filter 10. In such an embodiment the filter 10, consisting primarily of media block 12, can be inserted in the terminal end of the exhaust duct forming the filtration circuit from its discharge port, so that the filter occupies the portion of the duct adjacent the discharge port in use. If the appliance was not configured to receive the filter 10, then it may be necessary to remove a louver or other covering emplaced over the discharge port of the exhaust duct in order to gain access thereto to install the filter 10. Oftentimes the exit louver or cover is held in place via a snap-fit connection. In that case the user can simply remove the louver/cover by pulling it against the action of the snap-fit connectors, install the filter 10 within the exposed exhaust duct and then snap the louver/cover back into place. Alternatively, the louver or cover may be held in place via other conventional fasteners, such as screws or bolts, which may require the use of a tool such as a screwdriver or nut driver to remove.

In preferred embodiments the media block 12 is elastically compressible so that it can be compressed in order to fit within and negotiate bends and obstructions in the exhaust duct of the microwave 16, and then re-expand to fill the entire cross-sectional area of that duct where it is emplaced. Such a media block 12 is conformable so that it can deflect from its unstressed, pre-compression state in order to conform to the available shape and volume within the exhaust duct where it is placed. This is particularly desirable in retrofit applications, where the exhaust duct may not have been configured to accommodate a filter as discussed above. Such installations may require the media block 12 to bend or flex to accommodate obstructions that did not contemplate insertion and placement of a filter. In preferred embodiments the media block 12 is viscoelastic so that upon compression it exhibits a slow return or delayed recovery (i.e. hysteresis) back to its pre-compression shape and dimension. Such delayed recovery can assist in inserting and emplacing the media block 12 around obstructions, bends, etc., in a compressed state, so that the media block 12 will not immediately re-expand thus allowing time to negotiate obstructions prior to its re-expansion.

The media block 12 also provides high airflow so it does not materially impede the vent-flow circuit; i.e. so that it does not present a substantial pressure drop. Yet it also provides a high degree of odor removal by filtering odor-causing contaminants because it possess higher sorbent loading compared to conventional kitchen filters, despite its low pressure drop.

Preferred structures and compositions of the media block 12 will now be described. A preferred media block 12 is composed of sintered plastic fibers having impregnated adsorbent or absorbent species (preferably particles) therein capable to capture and retain odor-causing contaminants prevalent in air flowing through the block 12. Sintered porous plastic filter blocks are known, for example from U.S. Pat. No. 6,849,214, the contents of which are incorporated herein by reference. In that patent the filter block is formed by sintering powdered plastic particles until a block having the desired porosity is obtained. In the present media block 12, however, the plastic material is provided in the form of fibers so that the final sintered media block 12 is composed of a fibrous matrix of interlinking, non-woven, high-loft plastic fibers that present a substantially open-air structure with minimal pressure drop compared to conventional sintered plastic filters made from powdered plastic particles. Unlike the latter, a sintered plastic-fiber media block as here described is composed of fibers interconnected with other fibers at discrete points along their respective lengths, wherein the structural and conformational features and shape of individual fibers remain largely intact. Accordingly, the resulting media block 12 is a fibrous matrix that exhibits very high air flow and low pressure drop as a result of the substantial void space defined between fibers throughout the matrix, as well as elastic and even viscoelastic properties based on the modulus and flexibility of the underlying fibers themselves. Such a sintered fibrous matrix is disclosed in U.S. Pat. No. 6,423,123, also incorporated herein by reference. In desirable embodiments the pressure drop across the media-block 12 will not exceed 3.5 in $H_2O$, more preferably 3 or 2.5 in H₂O, in the direction of flow (i.e. its depth) for a depth of or less than 2.5 inches, more preferably 3 inches.

Another advantage of the sintered plastic-fiber media block 12 is that adsorbent and/or absorbent particles for capturing odor-causing contaminants from filtered air can be integrated into the media block during the sintering process as described in the '123 patent incorporated above, such that those particles are retained to the fibers just below their (fiber) softening point before they re-harden to adhere the particles. That is, the particles can be mixed or incorporated into the fibrous matrix when or just prior to when the fibers are heated above their softening point. The particles are then adhered to the fibers as the material at the fiber surfaces just begins to flow, but leaving a substantial proportion (e.g. greater than 30%, 40%, 50%, 60% or 70%) of the outer particles surfaces themselves exposed to the void space within the fiber matrix. Once the matrix is cooled, the now-sintered, interlinked fibrous media block 12 incorporates the adsorbent/absorbent particles retained to surfaces of the fibers via the sintering process. Moreover, because a substantial proportion of the outer particles surfaces remains exposed to the void space within the matrix, as opposed to being enveloped by prior-flowed plastic or adhesive, the particles can provide more efficient adsorption or absorption of sorbable species entrained in air that passes through the media block 12. This is because a substantial proportion of the outer particle surfaces remains unencumbered and accessible to flowing gas for adsorption or sorbable species compared to other methods of embedding sorbent particles. In addition to the outer surface, a significantly higher proportion of interstitial surfaces in the sorbent particles also remains accessible through the tortuous pore network of the particles via openings at the particle surfaces, which are also now accessible to a greater extent than in conventional modes of embedding sorbent particles, which would tend to envelop and coat those surfaces and the pore openings therein. The result is an improvement in observable efficiency and sorbent capacity for the media block compared to other impregnation techniques for the sorbent(s).

Fibers

The fibers from which the media block 12 is prepared preferably are composite core-and-sheath fibers consisting of a thermoset core material and a thermoplastic sheath material. The thermoset core element is selected to impart to the fibers desired elastic and flexible properties, which will produce a media block 12 of the desired compressibility, flexibility and elasticity. Thermoset materials are preferred for the fiber core because they tend to possess greater rigidity and structural integrity then thermoplastic fibers, which generally are softer. The use of thermoset-core fibers can provide a finished, sintered media block 12 having robust structural integrity and which is self-supporting and sufficiently stiff to resist being compressed or blown out of the exhaust duct of the OTR appliance via flowing air. Conversely, the thermoplastic (e.g. polyethylene or other polyolefin) sheath is a softer, meltable component that will flow when heated to above its softening point and then re-harden when cooled, in order to contact and bond with adjacent fibers as well as sorbent particles during the sintering process. The manufacture of core-and-sheath fibers is generally known; e.g. fibers such as those described here can be made via a co-extrusion process as known in the art using a high-temperature core material (e.g. a thermoset) and a lower-temperature, high melt-index sheath material (e.g. thermoplastic).

The preferred composite fibers are composed of a polyester core and a polyethylene sheath. Polyesters have been found to possess elasticity and structural-integrity features suitable for making media blocks 12 having desired compressibility and elasticity characteristics as will be described below. In addition, they are highly insoluble in water, which is desirable because cooking fumes often include water vapor. They also possess sufficient temperature resistance to withstand the sintering process that melts and ultimately interlocks their respective thermoplastic sheaths, as well as in-service temperatures that may be expected in OTR applications, without negatively impacting their structural or physical (e.g. modulus, integrity) characteristics. Preferred polyesters for the core material of the fibers have the following physical properties:

SpG: 1.2 to 1.5, more preferably 1.38, g/cm³
Elastic modulus: 80 to 95, more preferably 90, GPa
Tenacity: 5 to 7, more preferably 6, g/d
Elongation at break: 15-30%, more preferably 25%
Melting point: 235-260 C, more preferably 250 C Though polyesters are preferred, it is contemplated that other thermoset plastics could be used, for example polyurethanes, epoxies and polyimides, to produce a media block having properties suitable to their respective characteristics. It is further contemplated that high-strength thermoplastics could be used for the fiber cores, though these may be less preferred in many applications due to their generally lower strength and structural integrity compared to thermoset materials.

Preferred polyethylenes for the sheath material of the fibers preferably have the following physical properties:

SpG: 0.85 to 0.95, more preferably 0.92, g/cm³
Melting point: 125 to 135, more preferably 130 C,
Tenacity: 1.0 to 1.5, preferably 1.25 g/d
Elongation at break: 45 to 50%, preferably 50%

Though polyethylenes have been found suitable in the present applications, other polyolefins and thermoplastics also could be used to provide the adhesive-sheath characteristics to facilitate effective sintering. For example, polypropylenes, polyamides and thermoplastic polyesters (namely terephthalate polyesters (PETs)) are all candidate materials, among others. One of ordinary skill should be able to select candidate thermoplastic materials for the fiber sheaths based on factors that could be determined via routine experimentation, such as compatibility and co-extrudability with the selected core (e.g. polyester) material, melt index suitable to facilitate sintering the fibers at the sintering temperature yet also low enough that it will remain sufficiently robust to maintain the bonds formed during sintering once cooled and during in-service applications, both with the sheaths of other fibers and with embedded sorbent particles The polyester-core/polyethylene sheath fibers for the media block 12 preferably have a staple length of 30-70 mm, more preferably 40-60 mm. A staple length of nominally 51 mm, wherein the core polyester has the aforementioned modulus and tensile properties, has been found to produce media blocks exhibiting good physical characteristics, as described below. The composite fibers also preferably have a Denier of 4-20, more preferably 10-20, and most preferably of or about 15. One suitable composite fiber material meeting the aforementioned criteria and composed of a polyester core with polyethylene sheath is Bicomponent bonding fiber available from Kilop USA, Inc.

In embodiments where a composite fiber utilizing both thermoplastic core and thermoplastic sheath materials is used, the respective thermoplastics should be selected so that the core thermoplastic material has a higher softening point (lower melt index) compared to the sheath thermoplastic. Preferably the core material melt index is no more than 50%, preferably no more than 30% or 20%, that of the sheath material in these embodiments, taking care to ensure that the melt index of the sheath material remains low enough that it will not soften during anticipated in-service temperatures for the finished filter. The core- and sheath-materials in composite, fully thermoplastic fibers should have respective melt indices that are sufficiently different so that at the sintering temperatures at which the sheath material softens and begins to flow in order to bond adjacent fibers and sorbent particles, the core material remains substantially integrated; i.e. such that the core material does not flow or deform, which could result in a deformed finished media block 12 having significantly reduced void space and increased pressure drop. That is, if the fibers begin to flow and melt as a whole during sintering, then they may tend to interlace and adhere with and to one another more so than just at discrete points along their respective lengths where they were in contact as loose strands. Rather, when the strands as a whole flow they can close up interstitial voids in the fiber matrix such that the entire volumetric mass will tend to flow together and compress under its weight at sintering temperatures. The effect will be that the sintered fibrous matrix may begin to approach, or perhaps approximate, a conventional sintered media as the void spaces between discrete fibers give way to a more conventional pore structure throughout a solid, flowed-together plastic mass. Assuring a wide margin between the melt indices of the respective core- and sheath-materials should permit selection of sintering temperatures that will soften the sheath material sufficiently to effect sintering but which will not soften the core material so that it begins to flow. In any event, the softening point of the core material should be at least 50% higher, and preferably at least 100% or 200% higher than anticipated in-service temperatures. In the case of cooking fumes, which may be expected to reach temperatures of 100° C. (i.e. saturation temperature of steam), the softening point of the core thermoplastic material should be at least 150° C., and preferably at least 200° C. or 300° C.

Alternatively to the composite core/sheath fibers described above, a sinterable fiber matrix suitable to prepare a media block 12 can be prepared by intermixing plain thermoset fibers with plain thermoplastic fibers according to a predetermined ratio. In this embodiment the thermoset fibers will impart to the media block 12 desired structural and physical characteristics based on the properties and prevalence of those fibers, whereas the intermixed thermoplastic fibers will serve to adhere all of the fibers together—effectively 'cross-linking' the thermoset fibers and adhering dispersed sorbent particles in order to integrate the media block 12. The thermoset and thermoplastic fibers of this embodiment can be composed of the same materials as the respective core- and sheath-materials of the composite fibers discussed above. Some iteration may be required to arrive at a desirable ratio of thermoset-to-thermosplastic fibers that will produce a media block 12 having the desired physical (e.g. elasticity, rigidity, structural integrity) characteristics. Moreover, as with the composite fibers described above, the degree of sintering also will impact these physical characteristics of the media block 12.

In still a further alternative the fibrous matrix for preparing the sintered-fiber media block can be composed entirely of thermoplastic fibers; either a mixture of fibers made of different thermoplastic materials having different melt indices as discussed above, or even of a single thermoplastic material. In the former embodiment the mixture of high- and low-melt index thermoplastic fibers can be tailored and adjusted to provide the desired degree of rigidity and structural integrity (likely based on the prevalence or proportion of the low-melt index fibers) while still affording sufficient internal adhesive character to provide effective sintering (based on the prevalence/proportion of high-melt index fibers). In the latter embodiment, the single thermoplastic material for all fibers must have a melt index high enough to provide effective sintering, but low enough that it will not reach its softening point at anticipated in-service temperatures for the finished filter. The single thermoplastic material also will need to provide sufficient rigidity and strength to yield a filter block having the desired or necessary physical properties of rigidity, resilience and flexibility.

In addition to the composite core-and-sheath fibers, the mixture of thermoset and thermoplastic fibers, or other predominant fiber arrangements for the fiber matrix as disclosed in the foregoing embodiments, the fiber matrix for preparing the media block 12 also preferably includes a population of robust, reinforcing fibers. The reinforcing fibers typically are longer and heavier than the predominant composite, mixed or other fibers as described above, and make up a relatively small proportion of the total fibers in the fiber matrix. The reinforcing fibers can be added and adjusted in proportions as desired, based on a routine iterative process, to tune the overall rigidity, resilience, elasticity, strength and structural integrity of the finished media block once desired physical properties have been approximated via the predominant fibers. In desirable embodiments, the reinforcing fibers are polyester fibers having a Denier in the range of 100 to 300, more preferably 150 to 250 and most preferably of or about 200, as well as a staple length of 25-45 mm, more preferably 35-40 mm, and most preferably about 38 mm (i.e. about 1.5 inches). These high-Denier fibers are much heavier than the predominant fibers throughout the matrix and can be used to tune the overall resilience of the final media block 12 once sintered. The reinforcing fibers, when present, preferably are dispersed uniformly throughout the fiber matrix prior to sintering at a rate of 5-20% total fiber weight, more preferably about 15% total fiber weight.

Sorbents

The sintered fibrous media block 12 can have embedded therein one or more sorbents effective to adsorb or absorb odor-causing contaminants found in cooking fumes, e.g. from a cooking range. The selection of particular sorbents may in some instances depend on the expected predominant odor-causing contaminants. Example sorbents include activated carbons, sodium bicarbonate, zeolites and other natural or synthetic ion exchange resins and molecular-sieve materials.

Particularly good results have been obtained in OTR applications using an activated carbon sold under the tradename Picactif S series by PicaUSA. This material is a coconut-shell derived activated carbon, effective to adsorb a broad range of volatile organic compounds due to its high proportion of micro- and meso-pore structure. Other activated coconut shell carbons with similar performance are available from Jacobi, Oxbow, Filtrex, and Calgon. Because the disclosed fiber-sintering process leaves substantial proportions of the particle surfaces accessible and uncoated with plastic or other materials, the aforementioned micro- and meso-pore structure remains largely accessible for capture of sorbent species flowing across the embedded-particle surfaces and over the surface porosity leading to the internal meso/micro-pore network. The activated carbon particles preferably have a particle-size distribution of 8/30 mesh, more preferably 20/40 mesh and most preferably 20/50 mesh. Optionally these or other activated carbon particles can be combined with other sorbents such as zeolites, e.g. Al—Si zeolites, which can be natural or synthetic. However, the Picactif activated coconut shell carbon has proven to provide good adsorptive performance as an embedded sorbent in sintered fiber media blocks by itself, for example at loading rates of 25-200 g/ft$^2$ of fibrous media block 12 at 1 inch thickness (volumetric loading rate of 300-2400 g/ft$^3$). Particularly desirable loading rates of the activated carbon are 50-100 g/ft$^2$ at 1-inch (nominal) final thickness (volumetric loading rate of nominally 600-1200 g/ft$^3$). Alternative sources of activated carbon also may be acceptable in other embodiments, e.g. wood-based, bituminous carbon.

Making of Media Block

Figure 5:
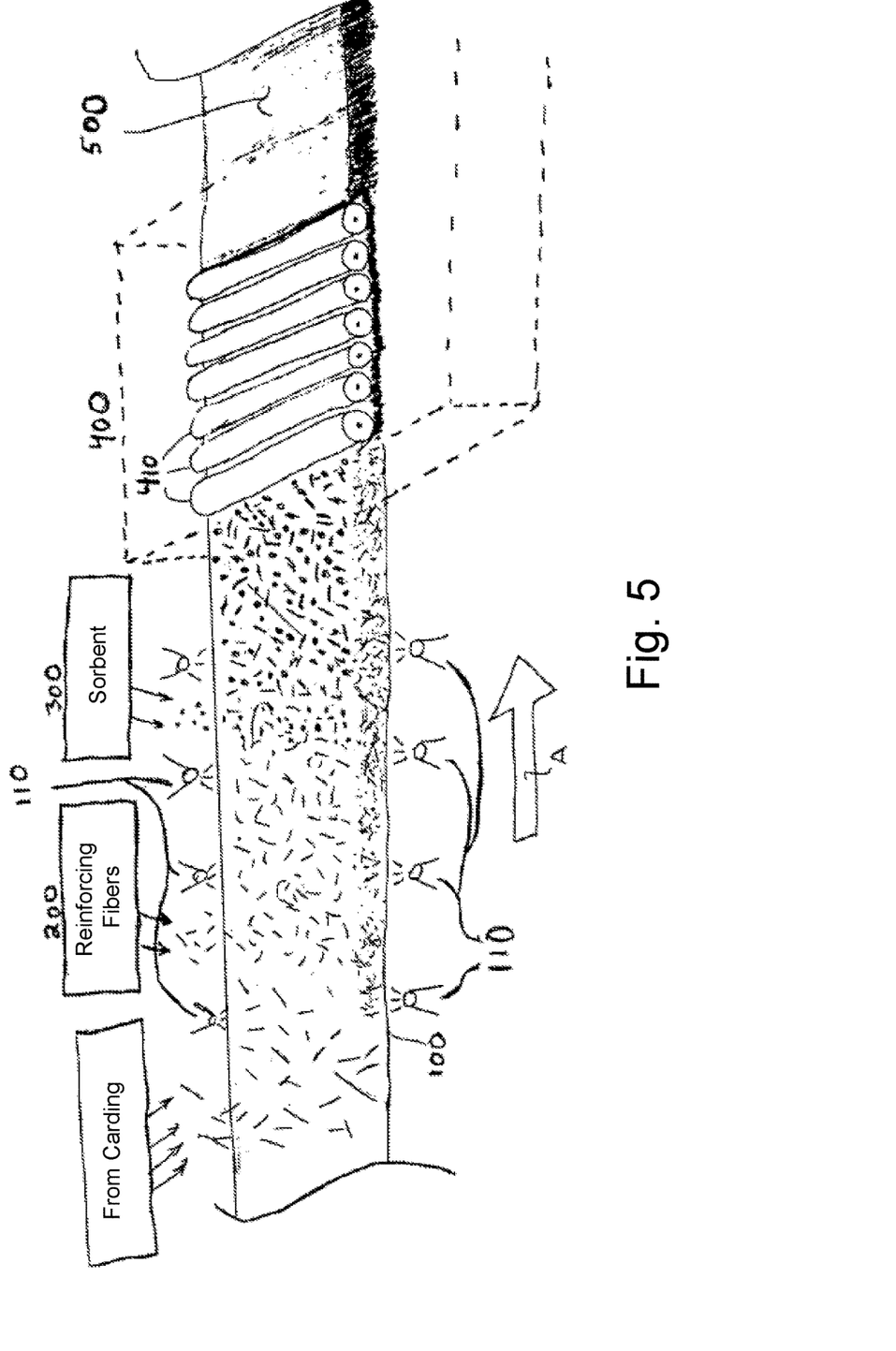
FIG. 5 illustrates a process for making a sintered fibrous web of filter material into individual conformable media blocks according to an embodiment.

Media blocks 12 as disclosed herein can be made as follows, with reference to FIG. 5.

The predominant fibers (e.g. core/sheath polyester/polyethylene fibers) typically are sourced in bails having the desired properties and dimensions. First these bails of fibers are opened and carded as known in the art, and the loosed, mixed fibers are delivered to a conveyor 100 for manufacturing a sintered fiber web 500. The non-woven, loosed fibers are delivered to the conveyor in a substantially uniform dispersion across the full width of the conveyor, which conventionally is 24-36 inches wide. The carding process delivers the loosed fibers to the conveyor at a loading density of 40-100 grams of fibers per square foot on the conveyor 100, preferably 50-80 g/sq.ft., and most preferably about 65 g/sq.ft. This loading density has been shown effective to produce a finished sintered fiber web having nominally a 1-2 inch thickness following all processing steps. Because the fibers are initially deposited loosely, however, the initial height of the lofted, non-sintered fiber mat on the conveyor may be greater than the final height after sintering. As will be appreciated, different loading densities may be selected to achieve final desired characteristics for the finished sintered fiber web 500 depending on numerous factors, such as the particular fibers selected, presence or absence of reinforcing fibers, desired bulk density and void fraction, etc.

The conveyor proceeds in the machine direction (arrow A) and carries the deposited, loose fiber mat through various processing stations. The loosed fibers are lofted and aerated via air jets 110 as they travel along the conveyor from where the carded fibers initially are deposited, to maintain a high void volume and facilitate uniform dispersal of both reinforcing fibers (if incorporated) and deposited sorbents, before reaching the pressing and sintering station(s). Alternatively or in addition, different modes of mixing and dispersing fibers can be used, such as vibration.

Upon reaching a reinforcing-fiber injection station 200, the reinforcing fibers are deposited on the conveyor and dispersed within and throughout the lofted fiber mat via aeration from the nozzles 110. Alternatively, instead of deposition at a reinforcing-fiber injection station 200 downstream the reinforcing fibers can be deposited and combined with the lofted fibers from the bails during and as part of the carding stage, prior to or during deposition on the conveyor 100. When the loosed-fiber loading density is 65 grams per square foot, the reinforcing fibers preferably are deposited at a rate of about 10 grams per square foot.

Upon reaching a sorbent-injection station 300, sorbent particles are deposited on the conveyor and dispersed within and throughout the lofted fiber mat, again via aeration. Using the preferred coconut-shell derived activated carbon, the preferred loading rate is 50-100 grams per square foot of the fiber mat as noted above, most preferably 100 grams per square foot. The sorbent particles can be deposited via gravity and rely entirely on aeration from nozzles 110 (and/or vibration) to disperse them throughout the fiber mat. Alternatively, they can be entrained in an air flow and blown into the mat via positive pressure through nozzles or jets, with or without the aid of aeration from nozzles 110 to achieve uniform dispersion.

In a preferred embodiment the sorbent particles are introduced and dispersed in the lofted fiber matrix after its temperature has been raised sufficiently so that thermoplastic fiber sheaths (or plain fibers) have already softened; i.e. so that the sorbent particles will begin to stick to the fibers on contact as they are dispersed therein. This can be achieved by a variety of means, including heating the conveyor at or upstream of where the sorbent particles will be deposited, heating the air from nozzles 110 used to aerate and loft the fibers, or delaying particle deposition until the conveyor has delivered the fiber matrix into a furnace at the sintering station 400.

The sintering station 400 can consist of an oven that is operated at a selected temperature in order to heat the thermoplastic fiber sheaths (or plain thermoplastic fibers if present) to just above their softening point in order to facilitate interlinking of those fibers throughout the matrix, both with other fibers and with dispersed sorbent particles. Rollers 410 compress the lofted fiber matrix in order to press together interspersed fibers. This promotes intimate contact between the fibers at discrete points along their lengths, as well as with other fibers (e.g. reinforcing fibers) and sorbent particles to facilitate bonding thereto while softened.

In addition to providing compressive force, the rollers 410 also can be heated in order to deliver the thermal energy necessary to raise (or sustain) thermoplastics in the fibers above their softening temperature. Heated rollers can be used exclusively for delivering thermal energy, or in addition to a surrounding oven.

The number of rollers 410 used, as well as the pressure applied to compress the fiber matrix, can be selected together with other factors (such as the sintering temperature based on the thermoplastic being used) to impart the desired degree of sintering. As will be appreciated, for a given thermoplastic (sheath or plain fibers) material a greater number of rollers, greater compression force of those rollers and higher sintering temperature all will tend to promote greater degrees of sintering, resulting in a denser finished sintered web 500 having a lower overall void fraction and a higher volumetric sorbent-loading rate. Conversely, lower values or numbers of those variables will tend to promote a lower degree of sintering (and lower volumetric sorbent-loading rate) for a given thermoplastic material. In desirable embodiments the sintering parameters are adjusted to ensure an overall void fraction in the finished sintered web 500 (and therefore in resulting media blocks 12) of at least 75%, more preferably 80% or 85%, and most preferably at least 90%. Such a high-lofted, sintered plastic-fiber web will result in high air flow and low pressure drop in OTR or other kitchen filtration applications as described herein.

In order to minimize thermoplastic flow over the surfaces of sorbent particles, the sintering temperature should be selected to be just sufficient to soften the thermoplastic so that it will flow and adhere to the particles, but not enough that it will flow around (and therefore envelope) them.

As the heat-softened, compressed fiber matrix emerges from the sintering station 400, it cools thus re-hardening the thermoplastic material. The hardened thermoplastic is now adhesively bonded to other fibers and to dispersed sorbent particles, thus yielding a sintered fiber web 500 at the conclusion of the process. Once the compressive force of rollers 410 is removed, the web 500 will tend to re-expand toward (but likely will not achieve) the pre-compression thickness of the pre-sintered fibrous matrix. The reason it will likely not recover to its full pre-compression thickness is that the sintering bonds that integrate the previously unjoined elements to form an integrated web 500 also hold those elements more tightly together so they can no longer fully re-expand. The result is an integrated, elastic or viscoelastic web 500 with a new, lower resting or 'relaxed' thickness.

Because the sintering process relies on softening and adhering fibers within the fibrous matrix to adjacent, contacting features (such as other fibers and particles) to form bonds, there is no separate adhesive that flows through the void space or that needs to coat bonding surfaces. As a result the void space within the sintered web 500 is unencumbered with excess adhesive material, and no adhesive has coated any of the interior surfaces of the web 500, including those of the embedded sorbent particles. Rather, those particles are retained via adhesion to contacting thermoplastic fiber sheaths (or plain fibers) only at the points of contact between the particles and the fibers. Thus a significant proportion of the overall particle surfaces, in fact the predominant proportion of those surfaces, is exposed to the void space within the sintered web 500, and therefore free to contact air flowing therethrough.

To prepare individual media blocks 12 from the sintered web 500, the web 500 can be sliced, die-cut or otherwise treated as known in the art to produce individual blocks 12 of desired length-width dimensions, all of which however preferably will retain a thickness equal to the final sintered-web 500 thickness (nominally 1 inch in desirable embodiments).

Using the preferred materials and methods described herein a sintered web 500, and consequently media blocks 12 that can be cut therefrom, can be prepared having viscoelastic qualities such that it exhibits a slow-return hysteresis following compression and removal of the compressive force. Such a material typically will exhibit compressibility in the range of 0.25 inches of deflection from a compressive force of 0.25-0.5 psi.; e.g. 0.5-1 inch/psi compression. If desired, the amount of reinforcing fibers as described above can be diminished to tune this value, for example to achieve lower stiffness, e.g. in the range of 0.75-1.5 inch/psi compression. Alternatively, the amount of reinforcing fibers can be increased to achieve higher stiffnesses in select applications. Other processing features also can be varied to tune the stiffness of the final material, for example the degree of sintering, average fiber length, fiber density, etc.

EXAMPLE

Media blocks 12 prepared from a sintered-fiber web made according to the preferred methods described above were tested according to ASHRAE 145.2-2011 for gas-phase air-cleaning performance against conventional filters used in kitchen OTR applications. In particular, media blocks 12 composed of Kilop USA composite fibers with embedded coconut-shell derived activated carbon sorbent at loading rates of 50 grams per square foot and 100 grams per square foot were compared against the conventional filters. The experimental filter blocks had the following properties.

Example 1

Nominal dimensions of 10.5" (H)×2.25" (W)×2.5" (D)

65 grams per square foot of Kilop USA composite fibers (polyester core and polyethylene sheath, staple length (nominal) of 51 mm, 15 Denier)

30 grams per square foot of 1.5 inch (nominal), 200 Denier polyester reinforcing fibers 50 grams per square foot of Picactif S series coconut-shell derived activated carbon.

Two pieces of media block stacked together to produce overall depth of 2.5"

Example 2

Nominal dimensions of 10.25" (H)×2" (W)×1.375" (D)

65 grams per square foot of Kilop USA composite fibers (polyester core and polyethylene sheath, staple length (nominal) of 51 mm, 15 Denier)

30 grams per square foot of 1.5 inch (nominal), 200 Denier polyester reinforcing fibers 100 grams per square foot of Picactif S series coconut-shell derived activated carbon These two example media blocks were compared in filtration performance against five commercially available OTR filters currently used in consumer OTR applications from five different manufacturers, according to ASHRAE 145.2-2011. Each of the five comparative filters is described below. The samples in Comparative Examples A-D consisted of a metal mesh screen having a carbon-loaded slurry coating the mesh material. The samples in Comparative Example E consisted of a carbon-loaded mesh screen material in a pleated filter arrangement bound within a perimeter frame.

Comparative Example A

Four samples from a first manufacturer, each having nominal dimensions of 10" (H)×3" (W) (Precise dimensions reported in FIG. 6; Example A.1 had negligible depth)

Comparative Example B

Four samples from a second manufacturer, having nominal dimensions of 8.75" (H)×3.875" (W)×0.312" (D)

Comparative Example C

Four samples from a third manufacturer, having nominal dimensions of 6.25" (H)×3.875" (W)×0.312" (D)

Comparative Example D

Four samples from a fourth manufacturer, having nominal dimensions of 5.125" (H)×5.375" (W)×0.312" (D)

Comparative Example E

Four samples from a fifth manufacturer, having nominal dimensions of 9.125" (H)×2.75" (W)×0.75" (D)

As noted above this filter consisted of a pleated panel and the depth value reported here is the height of the pleats.

Except where indicated otherwise below, the test conditions for all 22 experiments (Examples 1 and 2, and four samples each of Comparative Examples A through E) were carried out under the same standard conditions; namely:

Air flow rate: 164 CFM
Challenge gas: toluene
Relative humidity: 50% (nominal)
Temperature 78° F. (nominal)

Minor deviations from nominal R.H. and temperature during the seven experiments were insignificant and are not discussed here. However, the relative humidity during the test of Example 1 was only 34%.

The ASHRAE standard provides a mechanism to compare the performance of different filters under standard conditions. Because odor-causing contaminants in cooking fumes typically are VOCs, a VOC surrogate was selected as the challenge gas according to the standard. Toluene was selected as the surrogate challenge gas pursuant to Table 6.1.4.1 in the ASHRAE 145.2-2011 Standard test method. A low concentration of 400 ppb and a high concentration of 50 ppm for the toluene challenge gas also were selected pursuant to that table for the Initial Efficacy and Standard Capacity tests, respectively. Test results are reported in FIG. 6.

Note that in FIG. 6, the first replicates in each of Comparative Examples A-E (i.e. [LETTER].1), were removed from an OTR unit from the market and tested together on the same day. These units also previously had undergone additional testing, and therefore may have already accumulated debris or been partially loaded prior to the present testing. Whereas, all remaining replicates (i.e. [LETTER].2 to [LETTER].4) in each of the Comparative Examples were obtained as fresh replacement parts sealed in original packaging, and were tested together on a different day than the first replicates. General differences in first-replicate performance compared to the remaining replicates may be explained by these differences. For example, pressure drop and breakthrough performance, overall, seems to have been higher in the second through fourth replicates as compared to the first replicates. This may be explained, in part, because the first replicates were exposed to ambient conditions for an extended period, and may have been pre-loaded, as compared to the remaining replicates, which arrived in sealed packaging prior to test.

As seen in the foregoing data, media blocks 12 made according to the present disclosure (Examples 1 and 2) performed considerably better than all five of the comparative examples of conventional OTR filter media found in the marketplace. Example 1, which incorporated 50 grams per square foot of activated coconut shell carbon exhibited in average efficiency (i.e. percentage removal of toluene from carrier air) of 32% at low challenge-gas concentration (used to simulate ordinary filtration conditions) during the 60-minute experiment. This compared the average zero, and in some cases sub-zero) average efficiencies seen for all five commercially available OTR filters. Thus, Example 1 exhibited an overall increase in efficiency greater than one order of magnitude under simulated ordinary filtration conditions. Sub-zero average efficiency values for select Comparative Examples are believed due to early saturation of the filter media and consequent desorption or other release of toluene from that media as the experiments continued. This is believed to have resulted in observed greater toluene concentration (albeit by a small degree) at the exit side of the filter compared to the inlet. Example 1 also exhibited roughly 3-7 times greater breakthrough time (95% breakthrough of upstream toluene concentration) at increased challenge-gas concentration (nominally 50 ppm) compared to the averages of all five of the Comparative Examples.

Example 2, which incorporated 100 grams per square foot of activated (Picactif S22) carbon, exhibited comparable performance to Example 1; i.e. one order of magnitude greater filtration performance under simulated ordinary filtration conditions for one hour, and roughly 3-4 times greater breakthrough time during the Standard Capacity test compared to the averages of the five commercially available filters.

These superior results were obtained despite the slightly higher pressure drop exhibited by the filter blocks of Examples 1 and 2 compared to the conventional filters under constant air flow rates. Indeed, although the filters in Examples 1 and 2 exhibited greater overall volumes, and therefore (at least in part) were able to hold a larger amount of embedded sorbent by mass, they nonetheless still yielded only modestly higher pressure drop due to the high-void, sintered fiber-matrix construction of the filters. It is believed that the slightly higher pressure drop observed for the filters of Examples 1 and 2 will be negligible in most if not all kitchen-filtration, including OTR, applications, and is far outweighed by the significant improvement in overall filter performance.

Note that the filter of Example 1 consisted of two filter blocks stacked together to produce the final reported depth. Such an arrangement can be prepared, e.g., via thermal fusing at the interfacial area between the layers. Because the filter of Example 1 was roughly double the volume with half the activated-carbon loading rate as Example 2, the total overall carbon-sorbent content between Examples 1 and 2 was roughly equal. Yet Example 1 exhibited about 50% greater efficiency than Example 2 during the low-concentration Initial Efficiency test for simulating ordinary filtration conditions over 60 minutes at constant flowrate. This suggests that filter efficiency may vary as a stronger function of residence time than sorbent loading.

The invention has been described with reference to example embodiments. Modifications and alterations will occur to others upon a reading and understanding of this specification. Example embodiments incorporating one or more aspects described above are intended to include all such modifications and alterations insofar as they come within the scope of the appended claims.

What is claimed is:

1. A kitchen appliance comprising an air-venting circuit configured to draw cooking fumes, and a filter disposed in said air-venting circuit to remove odor-causing contaminants from the cooking fumes prior to discharge thereof, said filter comprising a conformable media block that re-expands following compression thereof to conform to an available cross-sectional area of said air-venting circuit where the filter is installed, said media block further comprising reinforcing fibers having a Denier of 100 to 300 and a staple length of 25-45 mm, said reinforcing fibers being present at a rate of 5-20% total fiber weight in said media block.

2. The appliance of claim 1, said media block comprising sintered plastic fibers and sorbent particles adhered to said plastic fibers via sintering.

3. The appliance of claim 1, said media block comprising non-woven fabrics formed into a conformable block and impregnated with sorbent particles.

4. The appliance of claim 1, said appliance being an over-the-range appliance, said cooking fumes being generated beneath said appliance.

5. The appliance of claim 1, said media block having viscoelastic properties such that it exhibits slow-return hysteresis following compression and removal of the compressive force.

6. The appliance of claim 5, said media block having an overall void fraction of at least 80%.

7. The appliance of claim 2, said plastic fibers comprising composite fibers comprising a thermoset core material and a thermoplastic sheath material, said fibers being sintered via said thermoplastic sheath material.

8. The appliance of claim 7, said thermoplastic sheath material having a melting point of 125° C. to 135° C.

9. The appliance of claim 7, said sorbent particles being adhered to said thermoplastic sheath material in such a manner as to leave a substantial proportion of outer surfaces of said particles exposed to void space within the media block.

10. The appliance of claim 7, said thermoset core material comprising polyester having a specific gravity of 1.2 to 1.5, said thermoplastic sheath material comprising polyethylene having a specific gravity of 0.85 to 0.95.

11. The appliance of claim 7, said composite fibers having a Denier of 10-20 and a staple length of 30-70 mm.

12. The appliance of claim 1, said media block having a compressibility of 0.5-1 in/psi.

13. The appliance of claim 2, said sorbent particles comprising coconut-shell derived activated carbon.

14. The appliance of claim 1, said media block being viscoelastically compressible.

\* \* \* \* \*